(12) United States Patent
Prudkovskij et al.

(10) Patent No.: US 12,135,786 B2
(45) Date of Patent: Nov. 5, 2024

(54) METHOD AND SYSTEM FOR IDENTIFYING MALWARE

(71) Applicant: F.A.C.C.T. NETWORK SECURITY LLC, Moscow (RU)

(72) Inventors: Nikolay Sergeevich Prudkovskij, Moscow (RU); Dmitry Aleksandrovich Volkov, Moscow (RU)

(73) Assignee: F.A.C.C.T. NETWORK SECURITY LLC, Moscow (RU)

( * ) Notice: Subject to any disclaimer, the term of this patent is extended or adjusted under 35 U.S.C. 154(b) by 237 days.

(21) Appl. No.: 17/685,588

(22) Filed: Mar. 3, 2022

(65) Prior Publication Data
US 2022/0188417 A1 Jun. 16, 2022

Related U.S. Application Data

(63) Continuation of application No. PCT/RU2020/000140, filed on Mar. 16, 2020.

(30) Foreign Application Priority Data

Mar. 10, 2020 (RU) ................................ 2020110068

(51) Int. Cl.
*G06F 21/00* (2013.01)
*G06F 21/53* (2013.01)
*G06F 21/56* (2013.01)

(52) U.S. Cl.
CPC .......... *G06F 21/566* (2013.01); *G06F 21/53* (2013.01); *G06F 2221/033* (2013.01)

(58) Field of Classification Search
CPC .. G06F 21/53; G06F 21/566; G06F 2221/033; H04L 63/1416; G06N 20/20
See application file for complete search history.

(56) References Cited

U.S. PATENT DOCUMENTS

| 6,928,434 B1 | 8/2005 | Choi et al. |
| 7,225,343 B1 | 5/2007 | Honig et al. |

(Continued)

FOREIGN PATENT DOCUMENTS

| AU | 2017203008 B2 | 3/2019 | |
| CA | 2900312 A1 * | 8/2014 | ............. G06F 21/53 |

(Continued)

OTHER PUBLICATIONS

Notice of Allowance with regard to the counterpart U.S. Appl. No. 17/178,320 issued on Oct. 20, 2023.

(Continued)

*Primary Examiner* — Tri M Tran
(74) *Attorney, Agent, or Firm* — BCF LLP

(57) ABSTRACT

A method and a system for identifying malware are provided. The method comprises: during a training phase: receiving a given sample of training malware; analyzing the given sample of training malware; generating a respective behavioral report including indications of actions executed thereby in the isolated environment; determining, by analyzing the actions, for each one of the plurality of samples of training malware, a respective malware family thereof; identifying, within the respective behavioral reports associated with each one of the plurality of samples of training malware, a report group of behavioral reports associated with the samples of training malware of a given malware family; generating, for the given malware family, sets of training feature vectors; training a given classifier of an ensemble of classifiers, based on a respective set of training feature vectors to determine if a given in-use sample of malware is of the given malware family.

8 Claims, 3 Drawing Sheets

(56) References Cited

U.S. PATENT DOCUMENTS

| | | |
|---|---|---|
| 7,383,581 B1 | 6/2008 | Moore et al. |
| 7,496,628 B2 | 2/2009 | Arnold et al. |
| 7,712,136 B2 | 5/2010 | Sprosts et al. |
| 7,730,040 B2 | 6/2010 | Reasor et al. |
| 7,865,953 B1 | 1/2011 | Hsieh et al. |
| 7,958,555 B1 | 6/2011 | Chen et al. |
| 7,984,500 B1 | 7/2011 | Khanna et al. |
| 8,132,250 B2 | 3/2012 | Judge et al. |
| 8,151,341 B1 | 4/2012 | Gudov |
| 8,255,532 B2 | 8/2012 | Smith-Mickelson et al. |
| 8,260,914 B1 | 9/2012 | Ranjan |
| 8,285,830 B1 | 10/2012 | Stout et al. |
| 8,402,543 B1 | 3/2013 | Ranjan et al. |
| 8,448,245 B2 | 5/2013 | Banerjee et al. |
| 8,532,382 B1 | 9/2013 | Ioffe |
| 8,539,582 B1 | 9/2013 | Aziz et al. |
| 8,555,388 B1 | 10/2013 | Wang et al. |
| 8,561,177 B1 | 10/2013 | Aziz et al. |
| 8,600,993 B1 | 12/2013 | Gupta et al. |
| 8,612,463 B2 | 12/2013 | Brdiczka et al. |
| 8,625,033 B1 | 1/2014 | Marwood et al. |
| 8,635,696 B1 | 1/2014 | Aziz |
| 8,650,080 B2 | 2/2014 | O'Connell et al. |
| 8,660,296 B1 | 2/2014 | Ioffe |
| 8,677,472 B1 | 3/2014 | Dotan et al. |
| 8,683,595 B1 | 3/2014 | Barker |
| 8,776,229 B1 | 7/2014 | Aziz |
| 8,850,571 B2 | 9/2014 | Staniford et al. |
| 8,856,937 B1 | 10/2014 | Wüest et al. |
| 8,972,412 B1 | 3/2015 | Christian et al. |
| 8,984,640 B1 | 3/2015 | Emigh et al. |
| 9,026,840 B1 | 5/2015 | Kim |
| 9,060,018 B1 | 6/2015 | Yu et al. |
| 9,165,142 B1 | 10/2015 | Sanders et al. |
| 9,210,111 B2 | 12/2015 | Chasin et al. |
| 9,215,239 B1 | 12/2015 | Wang et al. |
| 9,223,972 B1 | 12/2015 | Vincent et al. |
| 9,253,208 B1 | 2/2016 | Koshelev |
| 9,330,258 B1 | 5/2016 | Satish et al. |
| 9,338,181 B1 | 5/2016 | Burns et al. |
| 9,357,469 B2 | 5/2016 | Smith et al. |
| 9,456,000 B1 | 9/2016 | Spiro et al. |
| 9,516,053 B1 | 12/2016 | Muddu et al. |
| 9,654,593 B2 | 5/2017 | Garg et al. |
| 9,705,904 B1 | 7/2017 | Davis et al. |
| 9,723,344 B1 | 8/2017 | Granström et al. |
| 9,736,178 B1 | 8/2017 | Ashley |
| 9,747,446 B1 | 8/2017 | Pidathala et al. |
| 9,917,852 B1 | 3/2018 | Xu et al. |
| 9,934,376 B1 | 4/2018 | Ismael |
| 10,148,685 B2 | 12/2018 | Hassanzadeh et al. |
| 10,284,574 B1 | 5/2019 | Aziz et al. |
| 10,467,411 B1 | 11/2019 | Pidathala et al. |
| 10,514,909 B2 | 12/2019 | Yahav et al. |
| 10,546,143 B1 | 1/2020 | Wesson |
| 10,783,247 B1 | 9/2020 | Steinfadt et al. |
| 10,990,674 B2 * | 4/2021 | Srinivasagopalan ............ G06F 16/2462 |
| 11,023,580 B1 | 6/2021 | Han et al. |
| 11,270,000 B1 | 3/2022 | Chiang et al. |
| 11,663,405 B2 | 5/2023 | Wilson et al. |
| 2002/0161862 A1 | 10/2002 | Horvitz |
| 2003/0009696 A1 | 1/2003 | Bunker et al. |
| 2006/0021029 A1 | 1/2006 | Brickell et al. |
| 2006/0037080 A1 | 2/2006 | Maloof |
| 2006/0074858 A1 | 4/2006 | Etzold et al. |
| 2006/0107321 A1 | 5/2006 | Tzadikario |
| 2006/0224898 A1 | 10/2006 | Ahmed |
| 2006/0253582 A1 | 11/2006 | Dixon et al. |
| 2007/0019543 A1 | 1/2007 | Wei et al. |
| 2007/0239999 A1 | 10/2007 | Honig et al. |
| 2007/0240220 A1 | 10/2007 | Tuvell et al. |
| 2008/0172651 A1 | 7/2008 | Davia |
| 2009/0138342 A1 | 5/2009 | Otto et al. |
| 2009/0281852 A1 | 11/2009 | Abhari et al. |
| 2009/0292925 A1 | 11/2009 | Meisel |
| 2010/0011124 A1 | 1/2010 | Wei et al. |
| 2010/0037314 A1 | 2/2010 | Perdisci et al. |
| 2010/0076857 A1 | 3/2010 | Deo et al. |
| 2010/0115620 A1 | 5/2010 | Alme |
| 2010/0115621 A1 | 5/2010 | Staniford et al. |
| 2010/0191737 A1 | 7/2010 | Friedman et al. |
| 2010/0205665 A1 | 8/2010 | Komili et al. |
| 2010/0235918 A1 | 9/2010 | Mizrahi et al. |
| 2011/0222787 A1 | 9/2011 | Thiemert et al. |
| 2012/0030293 A1 | 2/2012 | Bobotek |
| 2012/0079596 A1 | 3/2012 | Thomas et al. |
| 2012/0087583 A1 | 4/2012 | Yang et al. |
| 2012/0158626 A1 | 6/2012 | Zhu et al. |
| 2012/0233656 A1 | 9/2012 | Rieschick et al. |
| 2012/0291125 A1 | 11/2012 | Maria |
| 2013/0086677 A1 | 4/2013 | Ma et al. |
| 2013/0103666 A1 | 4/2013 | Sandberg et al. |
| 2013/0111591 A1 | 5/2013 | Topan et al. |
| 2013/0117848 A1 | 5/2013 | Golshan et al. |
| 2013/0191364 A1 | 7/2013 | Kamel et al. |
| 2013/0227691 A1 | 8/2013 | Aziz et al. |
| 2013/0263264 A1 | 10/2013 | Klein et al. |
| 2013/0297619 A1 | 11/2013 | Chandrasekaran et al. |
| 2013/0340080 A1 | 12/2013 | Gostev et al. |
| 2014/0033307 A1 | 1/2014 | Schmidtler |
| 2014/0058854 A1 | 2/2014 | Ranganath et al. |
| 2014/0082730 A1 | 3/2014 | Vashist et al. |
| 2014/0173287 A1 | 6/2014 | Mizunuma |
| 2014/0310811 A1 | 10/2014 | Hentunen |
| 2015/0007250 A1 | 1/2015 | Dicato, Jr. et al. |
| 2015/0049547 A1 | 2/2015 | Kim |
| 2015/0067839 A1 | 3/2015 | Wardman et al. |
| 2015/0163242 A1 | 6/2015 | Laidlaw et al. |
| 2015/0170312 A1 | 6/2015 | Mehta et al. |
| 2015/0178306 A1 | 6/2015 | Yang et al. |
| 2015/0200963 A1 | 7/2015 | Geng et al. |
| 2015/0220735 A1 | 8/2015 | Paithane et al. |
| 2015/0227364 A1 | 8/2015 | Asadullah et al. |
| 2015/0295945 A1 | 10/2015 | Canzanese et al. |
| 2015/0310010 A1 | 10/2015 | Brenner et al. |
| 2015/0356291 A1 | 12/2015 | Zakorzhevsky et al. |
| 2015/0363791 A1 | 12/2015 | Raz et al. |
| 2015/0381654 A1 | 12/2015 | Wang et al. |
| 2016/0036837 A1 | 2/2016 | Jain et al. |
| 2016/0036838 A1 | 2/2016 | Jain et al. |
| 2016/0044054 A1 | 2/2016 | Stiansen et al. |
| 2016/0055490 A1 | 2/2016 | Keren et al. |
| 2016/0057159 A1 | 2/2016 | Yin et al. |
| 2016/0065595 A1 | 3/2016 | Kim et al. |
| 2016/0112445 A1 | 4/2016 | Abramowitz |
| 2016/0127388 A1 | 5/2016 | Cabot et al. |
| 2016/0127907 A1 | 5/2016 | Baxley et al. |
| 2016/0132521 A1 | 5/2016 | Reininger et al. |
| 2016/0149943 A1 | 5/2016 | Kaloroumakis et al. |
| 2016/0191243 A1 | 6/2016 | Manning |
| 2016/0205122 A1 | 7/2016 | Bassett |
| 2016/0205123 A1 | 7/2016 | Almurayh et al. |
| 2016/0226894 A1 | 8/2016 | Lee et al. |
| 2016/0253679 A1 | 9/2016 | Venkatraman et al. |
| 2016/0261628 A1 | 9/2016 | Doron et al. |
| 2016/0267179 A1 | 9/2016 | Mei et al. |
| 2016/0285907 A1 | 9/2016 | Nguyen et al. |
| 2016/0306974 A1 | 10/2016 | Turgeman et al. |
| 2016/0359679 A1 | 12/2016 | Parandehgheibi et al. |
| 2017/0006045 A1 | 1/2017 | Kivva et al. |
| 2017/0034211 A1 | 2/2017 | Buergi et al. |
| 2017/0068816 A1 | 3/2017 | Cavazos |
| 2017/0111374 A1 | 4/2017 | Harris et al. |
| 2017/0111377 A1 | 4/2017 | Park et al. |
| 2017/0134401 A1 | 5/2017 | Medvedovsky et al. |
| 2017/0142144 A1 | 5/2017 | Weinberger et al. |
| 2017/0149813 A1 | 5/2017 | Wright et al. |
| 2017/0171230 A1 | 6/2017 | Leiderfarb et al. |
| 2017/0200457 A1 | 7/2017 | Chai et al. |
| 2017/0230401 A1 | 8/2017 | Ahmed et al. |
| 2017/0244735 A1 | 8/2017 | Visbal et al. |
| 2017/0250972 A1 | 8/2017 | Ronda et al. |
| 2017/0251003 A1 | 8/2017 | Rostami-Hesarsorkh et al. |

(56) References Cited

U.S. PATENT DOCUMENTS

| | | |
|---|---|---|
| 2017/0262633 A1 | 9/2017 | Miserendino et al. |
| 2017/0272471 A1 | 9/2017 | Veeramachaneni et al. |
| 2017/0279818 A1 | 9/2017 | Milazzo et al. |
| 2017/0286544 A1 | 10/2017 | Hunt et al. |
| 2017/0289187 A1 | 10/2017 | Noel et al. |
| 2017/0295157 A1 | 10/2017 | Chavez et al. |
| 2017/0295187 A1 | 10/2017 | Havelka et al. |
| 2017/0324738 A1 | 11/2017 | Hari et al. |
| 2017/0346839 A1 | 11/2017 | Peppe et al. |
| 2018/0012021 A1 | 1/2018 | Volkov |
| 2018/0012144 A1 | 1/2018 | Ding et al. |
| 2018/0025157 A1 | 1/2018 | Titonis et al. |
| 2018/0034779 A1 | 2/2018 | Ahuja et al. |
| 2018/0063190 A1 | 3/2018 | Wright et al. |
| 2018/0096153 A1 | 4/2018 | Dewitte et al. |
| 2018/0115573 A1 | 4/2018 | Kuo et al. |
| 2018/0165452 A1 | 6/2018 | Sun et al. |
| 2018/0268464 A1 | 9/2018 | Li |
| 2018/0307832 A1 | 10/2018 | Ijiro et al. |
| 2018/0309787 A1 | 10/2018 | Evron et al. |
| 2018/0365420 A1 | 12/2018 | Krylov et al. |
| 2019/0005239 A1 | 1/2019 | Park et al. |
| 2019/0089737 A1 | 3/2019 | Shayevitz et al. |
| 2019/0114423 A1 | 4/2019 | Chistyakov et al. |
| 2019/0158525 A1 | 5/2019 | Rostami-Hesarsorkh et al. |
| 2019/0207973 A1 | 7/2019 | Peng |
| 2019/0230098 A1 | 7/2019 | Navarro |
| 2019/0294720 A1 | 9/2019 | Beringer et al. |
| 2019/0373005 A1 | 12/2019 | Bassett |
| 2020/0092306 A1 | 3/2020 | Jusko et al. |
| 2020/0134702 A1 | 4/2020 | Li |
| 2020/0162483 A1 | 5/2020 | Farhady et al. |
| 2020/0302058 A1 | 9/2020 | Kenyon et al. |
| 2020/0364334 A1 | 11/2020 | Pevny et al. |
| 2021/0141897 A1* | 5/2021 | Seifert .................. G06F 21/561 |
| 2021/0390182 A1 | 12/2021 | Boutnaru et al. |
| 2023/0252144 A1 | 8/2023 | Kim |

FOREIGN PATENT DOCUMENTS

| | | |
|---|---|---|
| CN | 103491205 A | 1/2014 |
| CN | 104504307 A | 4/2015 |
| CN | 103020494 B | 6/2015 |
| CN | 105429956 A | 3/2016 |
| CN | 105897714 A | 8/2016 |
| CN | 106131016 A | 11/2016 |
| CN | 106506435 A | 3/2017 |
| CN | 106713312 A | 5/2017 |
| CN | 107392019 A | 11/2017 |
| CN | 107392456 A | 11/2017 |
| EP | 1160646 A2 | 12/2001 |
| EP | 2916256 A1 | 9/2015 |
| EP | 2410452 B1 | 1/2016 |
| EP | 2743854 B1 | 12/2018 |
| EP | 2946331 B1 | 8/2019 |
| EP | 3800570 A1 | 4/2021 |
| GB | 2425622 A | 11/2006 |
| GB | 2493514 A | 2/2013 |
| KR | 10-2007-0049514 A | 5/2007 |
| KR | 20120090131 A | 8/2012 |
| KR | 10-1514984 B1 | 4/2015 |
| RU | 91213 U1 | 1/2010 |
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2580036 C2 | 4/2016 |
| RU | 2589310 C2 | 7/2016 |
| RU | 164629 U1 | 9/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2636702 C1 | 11/2017 |
| RU | 2654146 C1 | 5/2018 |
| RU | 2670906 C9 | 12/2018 |
| RU | 2681699 C1 | 3/2019 |
| RU | 2702269 C1 | 10/2019 |
| RU | 2706883 C1 | 11/2019 |
| RU | 2706896 C1 | 11/2019 |
| RU | 2708356 C1 | 12/2019 |
| RU | 2728497 C1 | 7/2020 |
| RU | 2728498 C1 | 7/2020 |
| RU | 2738344 C1 | 12/2020 |
| WO | 0245380 A2 | 6/2002 |
| WO | 2009/026564 A1 | 2/2009 |
| WO | 2011/045424 A1 | 4/2011 |
| WO | 2012/015171 A2 | 2/2012 |
| WO | 2017/111835 A1 | 6/2017 |
| WO | 2019/010182 A1 | 1/2019 |

OTHER PUBLICATIONS

Lajevardi et al., "A semantic-based correlation approach for detecting hybrid and low-level APTs", Future Generation Computer Systems 96(1), Feb. 2019, 25 pages.

Office Aciton with regard to the counterpart U.S. Appl. No. 17/586,010 mailed Dec. 8, 2023.

Notice of Allowance with regard to the counterpart U.S. Appl. No. 17/486,428 mailed Dec. 13, 2023.

Search Report with regard to RU Patent Application No. 2021108261 completed Feb. 28, 2022.

English Abstract for RU91213 retrieved on Espacenet on Mar. 25, 2022.

Notice of Allowance with regard to the U.S. Appl. No. 17/077,132 mailed Oct. 11, 2022.

Search Report with regard to EP Patent Application No. EP20924272 completed Nov. 30, 2022.

Chandramohan et al., "A scalable approach for malware detection through bounded feature space behavior modeling", 28TH IEEE/ACM International Conference on Automated Software Engineering (ASE), IEEE, 2013, pp. 312-322.

Alahmadi et al., "MalClassifier: Malware family classification using network flow sequence behaviour", APWG Symposium on Electronic Crime Research (ECRIME), IEEE, 2018, pp. 1-13.

Galal et al., "Behavior-based features model for malware detection", Journal of Computer Virology and Hacking Techniques, Springer Paris, vol. 12, No. 2, 2015, pp. 59-67.

Pirscoveanu et al., "Analysis of malware behavior: Type classification using machine learning", International Conference on Cyber Situational Awareness, Data Analytics and Assessment (CYBERSA), Centre for Multidisciplinary Research, Innovation and Collaboration, 2015, pp. 1-7.

Search Report with regard to RU Patent Application No. 2020110068 completed Sep. 8, 2020.

International Search Report with regard to PCT/RU2020/000140 mailed Nov. 19, 2020.

Search Report with regard to RU Patent Application No. 2020107922 completed Mar. 24, 2020.

International Search Report with regard to PCT/RU2020/000089 mailed Oct. 29, 2020.

English Abstract for CN107392019 retrieved on Espacenet on Dec. 2, 2021.

Notice of Allowance with regard to the U.S. Appl. No. 17/087,775 mailed Nov. 15, 2021.

(56) References Cited

OTHER PUBLICATIONS

Search Report with regard to the NL Patent Application No. 2027556 completed Sep. 29, 2021.
Phuong, "On Preempting Advanced Persistent Threats Using Probabilistic Graphical Models", arxiv.org, Cornell University Library, 201 Olin Library Cornell University Ithaca, NY 14853, Mar. 2019, pp. 1-14.
Manuel et al., "A survey on automated dynamic malware-analysis techniques and tools", ACM Computing Surveys, vol. 44, No. 2, Feb. 2012, pp. 1-49.
Tokhtabayev et al., "Malware Analysis and Detection via Activity Trees in User-Dependent Environment", Aug. 2017, ICIAP: International Conference on Image Analysis and Processing, 17th International Conference, Naples, Italy, Sep. 9-13, 2013. Proceedings; [Lecture Notes in Computer Science; Lect.Notes Computer], Springer, Berlin, Heidelberg, pp. 211-222.
Office Action with regard to the counterpart U.S. Appl. No. 15/707,641 mailed Apr. 25, 2019.
English Translation of CN106713312, © Questel—FAMPAT, Jul. 17, 2019.
English Translation of CN105897714, © Questel—FAMPAT, Jul. 17, 2019.
English Translation of CN106506435, © Questel—FAMPAT, Jul. 26, 2019.
English Translation of CN107392456, © Questel—FAMPAT, Jul. 29, 2019.
English Translation of CN103491205, © Questel—FAMPAT, Jul. 29, 2019.
English Translation of CN106131016, © Questel—FAMPAT, Jul. 17, 2019.
Invitation to Respond to Written Opinion received Aug. 5, 2019 with regard to the counterpart SG Patent Application No. 10201900339Q.
Invitation to Respond to Written Opinion received Aug. 5, 2019 with regard to the counterpart SG Patent Application No. 10201901079U.
Invitation to Respond to Written Opinion received Jul. 31, 2019 with regard to the counterpart SG Patent Application No. 10201900335P.
Search Report with regard to the counterpart RU Patent Application No. 2018144708 completed Aug. 16, 2019.
English Translation of KR10-2007-0049514 (Description, Claims) retrieved on Espacenet on Oct. 16, 2019.
Search Report with regard to the counterpart RU Patent Application No. 2018147431 completed Aug. 15, 2019.
English Abstract of KR10-1514984 retrieved on Espacenet on Oct. 15, 2019.
Office Action with regard to the counterpart U.S. Appl. No. 16/261,854 mailed Oct. 21, 2019.
Notice of Allowance with regard to the counterpart U.S. Appl. No. 15/707,641 mailed Oct. 30, 2019.
Whyte, "DNS-based Detection of Scanning Worms in an Enterprise Network", Aug. 2004, NOSS, pp. 1-17 {Year: 2005)—Notice of Allowance with regard to the counterpart U.S. Appl. No. 15/707,641.
Office Action with regard to the counterpart U.S. Appl. No. 15/858,013 mailed Nov. 22, 2019.
Search Report with regard to the counterpart SG Patent Application No. 10201900062S mailed Dec. 5, 2019.
Search Report with regard to the counterpart SG Patent Application No. 10201900060Y mailed Dec. 5, 2019.
English Abstract for CN105429956 retrieved on Espacenet on Jan. 7, 2020.
English Abstract for CN104504307 retrieved on Espacenet on Jan. 7, 2020.
Office Action received with regard to the counterpart U.S. Appl. No. 15/858,032 mailed Apr. 6, 2020.
Notice of Allowance with regard to the counterpart U.S. Appl. No. 15/858,013 mailed May 8, 2020.
Office Action with regard to the counterpart U.S. Appl. No. 16/270,341 mailed May 27, 2020.
Notice of Allowance with regard to the counterpart U.S. Appl. No. 15/858,013 mailed Jun. 10, 2020.
Office Action with regard to the counterpart U.S. Appl. No. 16/249,004 mailed Apr. 23, 2021.
English Abstract of RU107616 retrieved on Espacenet on Jul. 3, 2017.
European Search Report with regard to EP17180099 completed on Nov. 28, 2017.
European Search Report with regard to EP17191900 completed on Jan. 11, 2018.
Yoshioka et al., "Sandbox Analysis with Controlled Internet Connection for Observing Temporal Changes of Malware Behavior", https://www.researchgate.net/publication/254198606, 2009, 15 pages.
Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, pp. 210-218.
Wikipedia, "Blockchain", https://en.wikipedia.org/wiki/Blockchain retrieved on Jan. 9, 2019, pdf document, 18 pages.
Search Report with regard to the counterpart RU Patent Application No. 2018101764 completed Jun. 29, 2018.
Search Report with regard to the counterpart RU Patent Application No. 2018101761 completed Jun. 20, 2018.
International Search Report with regard to the counterpart Patent Application No. PCT/RU2016/000526 mailed Jun. 1, 2017.
Search Report with regard to the counterpart RU Patent Application No. 2018101760 completed Jun. 22, 2018.
Search Report with regard to the counterpart RU Patent Application No. 2018101759 completed Sep. 7, 2018.
English Abstract of RU129279 retrieved on Espacenet on Sep. 11, 2017.
English Abstract of RU164629 retrieved on Espacenet on Sep. 11, 2017.
English Abstract of RU2538292 retrieved on Espacenet on Sep. 11, 2017.
Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.
Search Report with regard to the counterpart Patent Application No. RU2018105377 completed Oct. 15, 2018.
Search Report with regard to the counterpart RU Patent Application No. 2018101763 completed Jan. 11, 2019.
Search Report with regard to the counterpart RU Patent Application No. 2016137336 completed Jun. 6, 2017.
English Abstract of RU2522019 retrieved on Espacenet on Jan. 25, 2019.
Search Report with regard to the counterpart RU Patent Application No. 2017140501 completed Jul. 11, 2018.
European Search Report with regard to the counterpart EP Patent Application No. EP17211131 completed Apr. 12, 2018.
European Search Report with regard to the counterpart EP Patent Application No. EP17210904 completed May 16, 2018.
Github / Linguist, https://github.com/github/linguist accessed on Sep. 24, 2021, pdf 6 pages.
Blackducksoftware / Ohcount, https://github.com/blackducksoftware/ohcount accessed on Sep. 24, 2021, pdf 4 pages.
Search Report with regard to the RU Patent Application No. 2020126232 completed Jan. 28, 2021.
Rudman et al., "Dridex: Analysis of the traffic and automatic generation of IOCs", IEEE, 2016, https://digifors.cs.up.ac.za/issa/2016/Proceedings/Full/paper%2041.pdf, pp. 77-84.
Grant Decision and Search Report with regard to the RU Patent Application No. 2019139630 completed Jun. 26, 2020.
Dauber et al., "Stylometric Authorship Attribution in Collaborative Documents", Materials of International Conference on Cyber Security Cryptography and Machine Learning (CSCML) 2017, pp. 115-135.
Afroz, Deception in Authorship Attribution, Drexel University, 2013, http://hdl.handle.net/1860/4431, pp. 1-91.
Granin, "Text Analyzer", https://habr.com/ru/post/114186/ and Machine Translation into English by Yandex Translate on Oct. 21, 2020, pdf 32 pages.

(56) References Cited

OTHER PUBLICATIONS

"Authorship Attribution Program by NeoNeuro", https://neoneuro.com accessed Jul. 31, 2020, pdf 5 pages.
"Tools for Software Analysis and Forensic Engineering, S.A.F.E.", https://www.safe-corp.com/index.htm accessed Jul. 31, 2020, pdf 2 pages.
English Abstract for CN 103020494 retrieved on Espacenet on Oct. 21, 2020.
Grant Decision and Search Report with regard to the RU Patent Application No. 2019139628 completed Jun. 26, 2020.
Office Action with regard to the counterpart U.S. Appl. No. 17/178,320 issued on Apr. 19, 2023.
English Abstract for KR20120090131 retrieved on Espacenet on Apr. 21, 2023.
Office Action with regard to the counterpart U.S. Appl. No. 17/486,428 issued on May 25, 2023.
Search Report with regard to the counterpart Patent Application No. NL 2029433 completed Oct. 18, 2022.
Singh Jagsir et al., "A survey on machine learning-based malware detection in executable files", Journal of Systems Architecture, Elsevier BV, NL, Aug. 2020, pp. 1-24.
Office Action with regard to te counterpart U.S. Appl. No. 17/586,010 issued Jun. 14, 2024.
Office Action with regard to the counterpart U.S. Appl. No. 17/586,010 issued Sep. 18, 2024.

\* cited by examiner

METHOD AND SYSTEM FOR IDENTIFYING MALWARE

CROSS-REFERENCE

The present application is a continuation of International Patent Application No.: PCT/RU2020/000140, entitled "METHOD AND SYSTEM FOR SEARCHING FOR SIMILAR MALICIOUS PROGRAMS ON THE BASIS OF DYNAMIC ANALYSIS RESULTS," filed on Mar. 16, 2020, which claims priority to Russian Patent Application No. 2020110068, filed on Mar. 10, 2020, the entirety of each of which is incorporated herein by reference.

FIELD

The present technology relates broadly to the field of cybersecurity; and, in particular, to the method and system for identifying malware.

BACKGROUND

Certain prior art approaches have been proposed to tackle the problem of malware identification.

U.S. Pat. No. 9,165,142-B1, issued on Oct. 20, 2015, assigned to Palo Alto Networks Inc, and entitled "MALWARE FAMILY IDENTIFICATION USING PROFILE SIGNATURES", discloses techniques for malware family identification using profile signatures. In some embodiments, malware identification using profile signatures includes executing a potential malware sample in a virtual machine environment (e.g., a sandbox); and determining whether the potential malware sample is associated with a known malware family based on a profile signature. In some embodiments, the virtual machine environment is an instrumented virtual machine environment for monitoring potential malware samples during execution.

U.S. Pat. No. 10,581,892-B2, issued on Mar. 3, 2020, assigned to Palo Alto Networks Inc, and entitled "AUTOMATICALLY GROUPING MALWARE BASED ON ARTIFACTS" discloses techniques for automatically grouping malware based on artifacts. In some embodiments, a system, process, and/or computer program product for automatically grouping malware based on artifacts includes receiving a plurality of samples for performing automated malware analysis to generate log files based on the automated malware analysis; processing the log files to extract features associated with malware; clustering the plurality of samples based on the extracted features; and performing an action based on the clustering output.

SUMMARY

It is an object of the present technology to address at least some inconveniences present in the prior art.

Unlike the prior art approaches, non-limiting embodiments of the present technology are directed to recording the actions executed by a malware sample in the behavioral report of JSON format. The obtained reports are separated so that one group contains reports comprising similar actions and related to a same known malware family. Further, the methods and systems described herein are directed to training an ensemble of classifiers based on indications of actions executed by malware samples affiliated with a given known, which may allow improving efficiency of identifying future malware.

More specifically, in accordance with a first broad aspect of the present technology, there is provided a computer-implementable method for training an ensemble of classifiers to identify malware. The method is executable by a processor. The method comprises: receiving, by the processor, a given sample of training malware of a plurality of samples of training malware; analyzing, by the processor, the given sample of training malware in an isolated environment; generating, by the processor, a respective behavioral report including indications of actions executed by the given sample of training malware in the isolated environment; identifying, by the processor, within the respective behavioral reports associated with each one of the plurality of samples of training malware, a report group of behavioral reports associated with the samples of training malware of a given malware family; determining, by the processor, by analyzing actions in the report group associated with the given malware family, reference actions common to every sample of training malware in the given malware family; generating, by the processor, for a given behavioral report of the report group, a respective training feature vector of a respective plurality of training feature vectors associated with the given malware family, based on data in at least one field of the given behavioral report corresponding to a respective reference action; training, by the processor, a given classifier of the ensemble of classifiers, based on the respective plurality of training feature vectors to determine if a given in-use sample of malware is of the given malware family.

In some implementations of the method, the method further comprises using, by the processor, the ensemble of classifiers to identify the given in-use sample of malware, by: receiving, by the processor, the given in-use sample of malware; analyzing, by the processor, the given in-use sample of malware in the isolated environment; generating, by the processor, an in-use behavioral report including indications of actions executed by the given in-use sample of malware; generating, by the processor, an in-use feature vector associated with the given in-use sample of malware, a given value of the in-use feature vector being generated based on data in a given field of the in-use behavioral report which corresponds to a respective reference action associated with a respective malware family; feeding, by the processor, the in-use feature vector to the ensemble of classifiers to generate a prediction outcome indicative of whether the given in-use sample of malware is of the respective malware family or not; and storing, by the processor, data of the prediction outcome in association with the given in-use sample of malware for further use in the identifying the malware.

In some implementations of the method, the analyzing the given sample of training malware in the isolated environment comprises analyzing at least one of: processes started by the given sample of training malware and each process starting parameters; files created by each process; mutexes created by each process; registry keys created by each process; virtual machine screen video during running of the given sample of training malware; indications of network activity; and harmfulness markers associated with the given sample of training malware.

In some implementations of the method, the respective behavioral report is a report in a JSON format including at least one of following fields associated with actions executed by the given sample of training malware: IP addresses, registry keys, mutexes, user agents, harmfulness markers, processes and running programs, types of requests and respective domains, and files.

In some implementations of the method, the prediction outcome of the ensemble of the classifiers takes values from −1 to 1, wherein −1 corresponds to the given in-use sample of malware not being of the given malware family, and 1 corresponds to the given in-use sample of malware being of the given malware family.

In some implementations of the method, a given ensemble of the classifiers is trained to identify malware of a respective malware family.

In some implementations of the method, the generating each feature vector comprises applying regular expressions to the respective behavioral report.

In some implementations of the method, the identifying the report group of behavioral reports associated with the samples of training malware of the given malware family is based on data of a database of known malicious files including behavioral features of one or more known malware families that have been identified using at least one of following approaches: ssdeep hashes, YARA signatures, and IDS signatures.

In accordance with a second broad aspect of the present technology, there is provided a system for training an ensemble of classifiers to identify malware. The system comprises a processor and a non-transitory computer-readable medium storing instructions. The processor upon executing the instructions is configured to: receive a given sample of training malware of a plurality of samples of training malware; analyze the given sample of training malware in an isolated environment; generate a respective behavioral report including indications of actions executed by the given sample of training malware in the isolated environment; identify, within the respective behavioral reports associated with each one of the plurality of samples of training malware, a report group of behavioral reports associated with the samples of training malware of a given malware family; determine, by analyzing actions in the report group associated with the given malware family, reference actions common to every sample of training malware in the given malware family; generate, for a given behavioral report of the report group, a respective training feature vector of a respective plurality of training feature vectors associated with the given malware family, based on data in at least one field of the given behavioral report corresponding to a respective reference action; train a given classifier of the ensemble of classifiers, based on the respective plurality of training feature vectors to determine if a given in-use sample of malware is of the given malware family.

In some implementations of the system, during an in-use phase following the training phase, the processor is further configured to: receive the given in-use sample of malware; analyze the given in-use sample of malware in the isolated environment; generate an in-use behavioral report including indications of actions executed by the given in-use sample of malware; generate an in-use feature vector associated with the given in-use sample of malware, a given value of the in-use feature vector being generated based on data in a given field of the in-use behavioral report which corresponds to a respective reference action associated with a respective malware family; feed the in-use feature vector to the ensemble of classifiers to generate a prediction outcome indicative of whether the given in-use sample of malware is of the respective malware family or not; and store data of the prediction outcome in association with the given in-use sample of malware for further use in the identifying the malware.

In the context of the present specification, unless expressly provided otherwise, a computer system may refer, but is not limited, to an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Implementation of the technique will be further described in accordance with the attached drawings, which are presented to clarify the technique chief matter and by no means limit the field of the technique. The following drawings are attached to the application.

DETAILED DESCRIPTION

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

System

Figure 1:
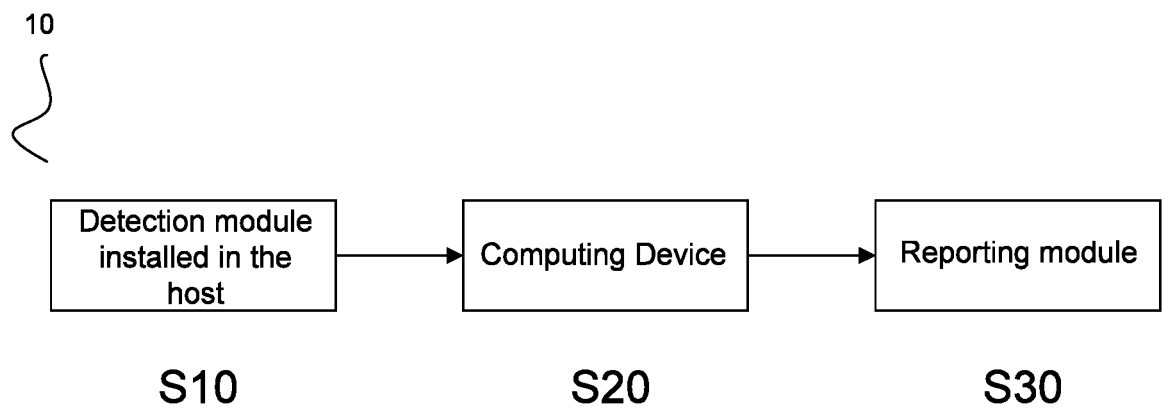
FIG. 1 depicts a schematic diagram of a system for identifying malware, in accordance with certain non-limiting embodiments of the present technology.

With reference to FIG. 1, there is depicted a schematic diagram of a system 10 for identifying malware, in accordance with certain non-limiting embodiments of the present technology. The system 10 comprises at least: (1) a recording module (S10) configured to record actions of at least one malware sample in a respective behavioral report, (2) a computing device (S20), and (3) output module (S30).

According to certain non-limiting embodiments of the present technology, the computing device S20 can comprise a computing environment 300 described below with reference to FIG. 3. To that end, the computing device S20 can include a processor 301.

It should be understood that the system 10 described herein is completely scalable, that is, it can operate in local as well as in global network.

Method

Figure 2:
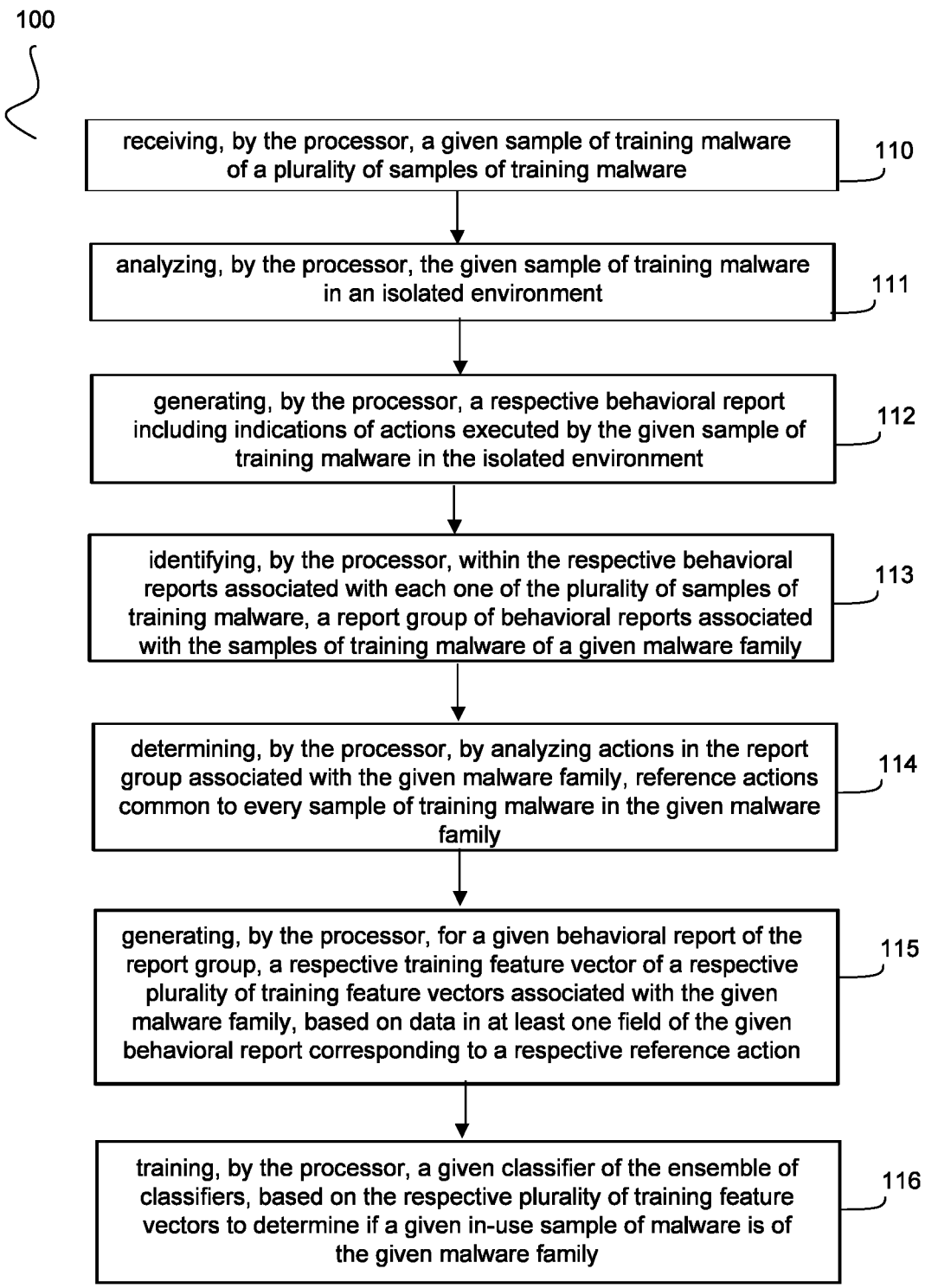
FIG. 2 depicts a flowchart diagram of a method of identifying the malware, in accordance with certain non-limiting embodiments of the present technology.

With reference to FIG. 2, there is depicted a flowchart diagram of a method 100 for identifying the malware, in accordance with certain non-limiting embodiments of the present technology. The method 100 can be executed by the processor 301 of the computing device S20.

According to certain non-limiting embodiments of the present technology, the method 100 includes training an ensemble of classifiers to determine a respective family of a given malware sample. Thus, the method 100 can include two separate phases: (1) a training phase, during which the processor 301 is configured to train the ensemble of classifiers; and (2) an in-use phase, during which the processor 301 is configured to apply the trained ensemble of classifiers to the given malware sample to identify the respective malware family thereof.

Step 110: Receiving, by the Processor, a Given Sample of Training Malware of a Plurality of Samples of Training Malware The training phase of the method 100 commences at step 110 where the processor 301 can be configured to receive a plurality of training malware samples for further generating a training set of data for training the ensemble of classifiers. According to certain non-limiting embodiments of the present technology, each one of the plurality of training malware samples can be of a respective known malware family. In some non-limiting embodiments of the present technology, each one of the plurality of training malware samples can be of a respective different known malware family.

Thus, the method 100 proceeds to step 111.

Step 111: Analyzing, by the Processor, the Given Sample of Training Malware in an Isolated Environment Further, at step 111, according to certain non-limiting embodiments of the present technology, the processor 301 can be configured to analyze a given training malware sample to record (or otherwise log), in an isolated environment (such as a virtual machine, as an example) all actions executed by the given training malware sample therein. For example, such action can include, without limitation:

a. processes launched by the given training malware sample and each process starting parameters;
 b. files created by each process;
 c. mutexes created by each process;
 d. registry keys created by each process;
 e. virtual machine screen video during malware running;
 f. network activity—all possible information on malware relationship with the network: request type (GET, POST, PUT, HEAD), user agent, domain, IP address, http/https, data transmitted in the request body, etc.; and
 g. harmfulness markers—what happened during malware running.

For example, if the execution of the given training malware sample causes creation of hidden or system files—the processor 301 can be configured to record and register a first harmfulness marker. Further, a second harmfulness marker can be indicative of the given training malware sample executing its code in unnamed regions of a random-access memory (such as at least one non-transitory computer-readable memory 302 described below). A third harmfulness marker can be indicative of the given training malware sample having abnormalities in its PE file structure. Self-replication of the given training malware sample can be a fourth harmfulness marker.

The method 100 hence advances to step 112.

Step 112: Generating, by the Processor, a Respective Behavioral Report Including Indications of Actions Executed by the Given Sample of Training Malware in the Isolated Environment Further, at step 112, based on indications of the actions executed by the given training malware sample in the isolated environment, the processor 301 can be configured to generate a respective behavioral report for the given training malware sample. In some non-limiting embodiments of the present technology, the respective behavioral report can be of a JSON format.

Thus, in some non-limiting embodiments of the present technology, the respective behavioral report can include multiple fields. Further, the processor 301 can be configured to select, from the fields of the respective behavioral report, the following fields: IP addresses, registry keys, mutexes, user agents, markers, processes and running programs, request type and domain, files, for generating training data for training each classifier of the ensemble of classifiers. For example, each one of the ensemble of classifiers can be trained based on a respective training set of data including one of:

network data associated with the given training malware sample;
 harmfulness markers identified during the execution of the given training malware sample;
 registry keys created during the execution of the given training malware sample;
 processes launched during the execution of the given training malware sample;
 mutexes associated with the given training malware sample; and
 files created during the execution of the given training malware sample.

The method 100 thus advances to step 113.

Step 113: Identifying, by the Processor, within the Respective Behavioral Reports Associated with Each One of the Plurality of Samples of Training Malware, a Report Group of Behavioral Reports Associated with the Samples of Training Malware of a Given Malware Family Further, at step 113, the processor 301 can be configured to distribute respective behavioral reports associated with each one of the plurality of training malware samples into report groups in accordance with malware families thereof, such that a given report group would include the respective behavioral reports generated based on the actions executed by training malware samples of a respective malware family (or alternatively associated with one malware development team).

In some non-limiting embodiments of the present technology, to identify the given report group, the processor 301 can be configured to access a database of known malicious files, including behavioral features of one or more known malware families that have been identified using at least one of following approaches: YARA rules, IDS signatures, behavioral signatures, ssdeep utility.

In the context of the present specification, YARA rules are text or binary samples where malware formalized features (signatures) are described. Each description consists of the rules representing a set of lines and some logical expression, on the basis of which the analyzer actuation logic is defined. If at least one rule condition is defined for the investigated file, this file is classified as a malicious file. Such rules are written by experts and can be updated from time to time.

At executing each training malware sample in the isolated environment, it is additionally checked by YARA rules.

In the context of the present specification, IDS signatures are rules for detecting malicious activity by network traffic analysis. If the analyzed file exhibits network activity, its traffic enables to give more exact classification and understand, malware of which family is being analyzed. Executable file compression/encryption is often used to bypass the signature analysis; however, traffic analysis does not depend on the file modifications that have been done, therefore, all its modifications can be identified exactly.

Further, in the context of the present specification, behavioral signatures are the rules describing specific features of behavior for specific malware type. It enables to classify exactly malware samples when they do not exhibit network activity and are not detected by other features. Such rules are written by experts and can be updated from time to time.

Further, in the context of the present specification, the ssdeep utility is a tool for recursive computation and comparison of context partial hashes (fuzzy hashing). Thus, malware samples relating to a same malware family can be detected at fuzzy hashing. It is worth noting that ssdeep is configured to break a given malware sample into pieces and starts hash function for each of them. Final hash is built according to this hashing result. If only several bites are changed, hash value of this given malware sample will change insignificantly.

Thus, having access to the database of known malicious files, the processor 301 can be configured to separate the respective behavioral reports of each one of the plurality of training malware samples according to their malware families. The method 100 thus advances to step 114.

Step 114: Determining, by the Processor, by Analyzing Actions in the Report Group Associated with the Given Malware Family, Reference Actions Common to Every Sample of Training Malware in the Given Malware Family Further, at step 114, the processor 301 can be configured to determine, based on the behavioral reports in the given group, reference actions, that is, common actions executed by the training malware samples associated with the respective malware family.

For example, a given malware family can be characterized as interacting in certain way with:
 CPU registries and memory (access microprocessor registries, memory cells, stacks, device ports);
 OS (calls: WinAPI, NativeAPI, syscall);
 changes in the file system (creation of files (including executable), registry entries at program start);
 program networking (how a malware interacts with management centers for data transmission and receipt of commands);
 code interception and injection (code or libraries interception or injection into the other processes).

Comparing the behavioral features to the features of unclassified malwares it is possible to detect malware modifications. Thus, for example, comparing the given malware sample to typical behavior, specific to the given malware family, the processor 301 can be configured for determining if the given malware sample is of the given malware family or not.

The method 100 thus advances to step 115.

Step 115: Generating, by the Processor, for a Given Behavioral Report of the Report Group, a Respective Training Feature Vector of a Respective Plurality of Training Feature Vectors Associated with the Given Malware Family, Based on Data in at Least One Field of the Given Behavioral Report Corresponding to a Respective Reference Action Further, at step 115, the processor 301 can be configured to generate, for the given report group, a plurality of training feature vectors used for training a respective classifier of the ensemble of classifiers. More specifically, the processor 301 can be configured to generate a given training feature vector based on data in at least one field of a respective behavioral report of the given report group associated with the given malware family.

For example, the processor 301 can be configured to generate the given training feature vector by assigning to a given cell of the given training feature vector a Boolean value (that is, '1' or '0', as an example) indicative of whether the data in each of the fields of the respective behavioral report corresponds to the reference actions associated with the given malware family. To that end, in some non-limiting embodiments of the present technology, the processor 301 can be configured to apply a regular expression configured to identify whether data of a given field of the respective behavioral report corresponds to a respective reference action associated with the given malware family.

The method 100 hence proceeds to step 116.

Step 116: Training, by the Processor, a Given Classifier of the Ensemble of Classifiers, Based on the Respective Plurality of Training Feature Vectors to Determine if a Given In-Use Sample of Malware is of the Given Malware Family Thus, having determined respective pluralities of training feature vectors corresponding to different malware families, at step 116, the processor 301 can be configured to feed each one of the pluralities of training feature vectors to a respective classifier of the ensemble of classifiers for training thereof.

Thus, by way of example only and not as a limitation, the processor 301 can be configured to train: (i) a first classifier of the ensemble of classifier based on a first plurality of feature vectors generated based on the data in the "harmfulness marker" in a first report group, (ii) a second classifier of the ensemble based on a second plurality of training feature vectors generated based on report fields "user agents", "IP addresses", "request type" and "domain", in a second report group, and so on.

Thus, the processor 301 can be configured to train each one of the ensemble of classifiers to generate a respective verdict indicative of whether the given malware sample is of the respective malware family or not. The number of verdicts is equal to the number of malware families, such as ISRStealer family, Meterpreter family, and the like.

Further, in some non-limiting embodiments of the present technology, the processor 301 can be configured to assign, to each one of the ensemble of classifiers, a respective weight value, which represents an accuracy of each classifier (two classes of accuracy—a given malware family and relative to all the others). Accuracy is taken based on classifier operation on the respective training set of data (the respective plurality of training feature vectors used for training).

Further, in some non-limiting embodiments of the present technology, the processor 301 can be configured to normalize respective weight values associated with then classifiers such that a sum thereof equals 1.

Then when classifying a new malware sample, the processor can be configured to multiply the obtained coefficient by the normalized difference "opt_proba" (optimal split for this classifier, above which the new malware sample could be considered belonging to the respective malware family associated with this classifier) and "cur_proba" (result of computing a probability of the new malware sample relation to respective malware family according to the specific field).

Then, having summarized all the products corresponding to each of the classifier of the ensemble (6, as an example), the processor 301 can be configured to obtain an estimate from −1 to 1, where −1 means "the new malware sample does not belong to respective malware family at all", and 1—"the new malware sample belongs to the respective malware family".

Thus, the training phase of the method 100 terminates.

Further, during the in-use phase, the processor 301 can be configured to receive the given malware sample for execution thereof in the isolated environment as described above with respect to the training malware samples. Further, the processor 301 can be configured to record all actions executed by the given malware sample, thereby generating a respective in-use behavioral report. Further, based on data in the fields of the respective in-use behavioral report, the processor 301 can be configured to generate a plurality of in-use feature vectors for the given malware sample. More specifically, the processor 301 can be configured to generate a given in-use feature vector such that a given value thereof is determined as being a Boolean value (that is, '1' or '0', as an example) indicative of whether data of a respective field in the respective in-use behavioral report corresponds to a respective reference action associated with the respective malware family. For example, in some non-limiting embodiments of the present technology, to generate the given in-use feature vector, the processor 301 can be configured to apply a regular expression.

Further, the processor 301 can be configured to feed each one of the plurality of in-use feature vectors associated with the different respective malware families to the respective ones of the ensemble of classifiers. Thus, each of the classifiers generates a prediction outcome, that is, a numerical estimate of probability indicative of the given malware sample belongs to the respective malware family associated with each one of the ensemble of classifies.

Further, in response to the prediction outcome being greater than a predetermined prediction outcome threshold (such as 0.8, for example) generated by a given classifier, the processor 301 can be configured to determine the given malware sample as being of the respective malware family associated with the given classifier.

Further, the processor 301 can be configured to store the prediction outcomes generated by each one of the ensemble of classifiers in a memory, such as a storage 303 described below. For example, stored predictions outcomes can be used for further identifying malware.

For example, the features, which have been detected in the operating system during its running, are extracted from the reports. These features are similar to the features which are used for defining the program harmfulness fact. For example, one of the malicious behavior features is the fact of adding a new program into the list of automatically loaded programs at booting the system. However, if for the sandbox analysis the mere fact that the program has been added to the autostart list is important, the search for similar malwares requires to associate this action with the behavior of the specific malware family. Therefore, the following features are important for searching for similar malwares: file name length, file extension, what method of adding to the autostart list is used. The following features are generally used:
changes in the file system;
changes in the operating system registry;
changes in the processes created in the operating system;
program networking;
harmfulness markers.

The extracted features are sent for analysis to the ensemble of classifiers, which is to detect from all the features, which features are typical or, vice versa, not typical of the specific family, and based on these features to render a verdict about belonging this malware to the specific malware family.

It should be noted that if after analyzing the given malware sample as described above, each one of the ensemble of classifiers has generated their verdicts being "no", that is, the given malware sample has not been classified as being of any respective family associated with the ensemble of classifiers, and none of the prediction outcomes thereof has exceeded the predetermined prediction outcome threshold, the processor 301 can be configured to determine the given malware sample as being of a yet unknown malware family.

The method 100 hence terminates.

Computing Environment

Figure 3:
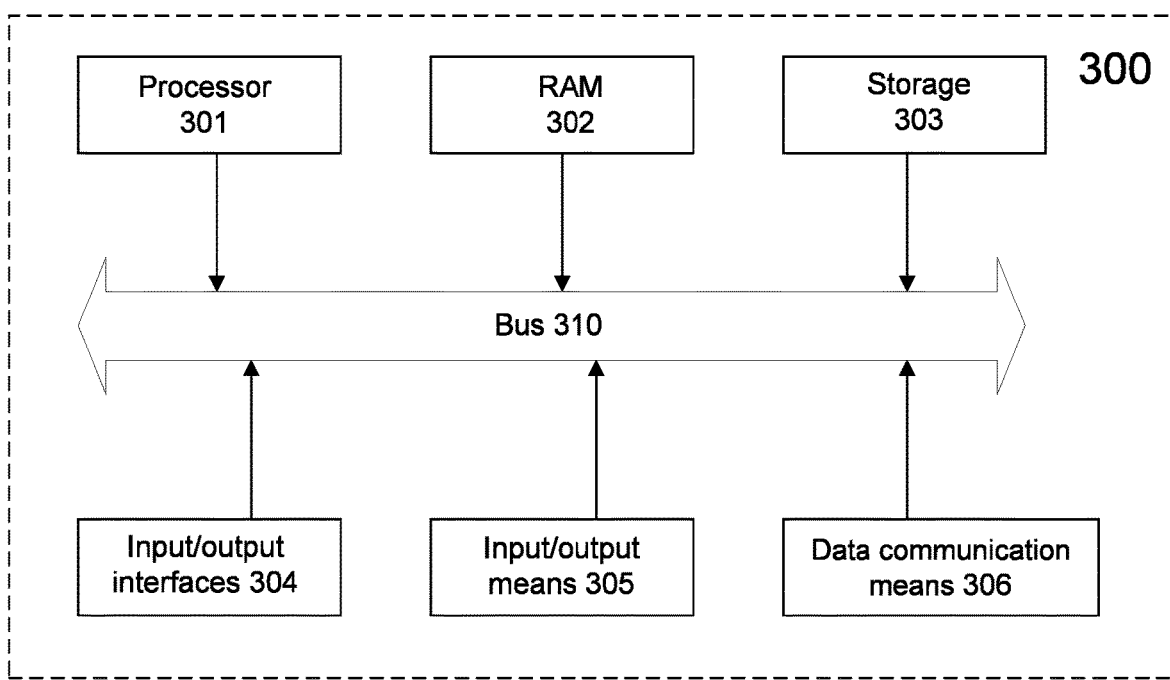
FIG. 3 depicts a schematic diagram of an example computing environment configurable for execution of the present method of FIG. 2, in accordance with certain non-limiting embodiments of the present technology.

With reference to FIG. 3, there is depicted an example functional diagram of the computing environment 300 configurable to implement certain non-limiting embodiments of the present technology including the method 100, described above.

In some non-limiting embodiments of the present technology, the computing environment 300 may include: the processor 301 comprising one or more central processing units (CPUs), at least one non-transitory computer-readable memory 302 (RAM), a storage 303, input/output interfaces 304, input/output means 305, data communication means 306.

According to some non-limiting embodiments of the present technology, the processor 301 may be configured to execute specific program instructions the computations as required for the computing environment 300 to function properly or to ensure the functioning of one or more of its components. The processor 301 may further be configured to execute specific machine-readable instructions stored in the at least one non-transitory computer-readable memory 302, for example, those causing the computing environment 300 to execute the method 100, as an example.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scrips or XML. Various algorithms are implemented with any combination of the data structures, objects, processes, procedures and other software elements.

The at least one non-transitory computer-readable memory 302 may be implemented as RAM and contains the necessary program logic to provide the requisite functionality.

The storage 303 may be implemented as at least one of an HDD drive, an SSD drive, a RAID array, a network storage, a flash memory, an optical drive (such as CD, DVD, MD, Blu-ray), etc. The storage 303 may be configured for long-term storage of various data, e.g., the aforementioned documents with user data sets, databases with the time intervals measured for each user, user IDs, etc.

The input/output interfaces 304 may comprise various interfaces, such as at least one of USB, RS232, RJ45, LPT, COM, HDMI, PS/2, Lightning, FireWire, etc.

The input/output means 305 may include at least one of a keyboard, a joystick, a (touchscreen) display, a projector, a touchpad, a mouse, a trackball, a stylus, speakers, a microphone, and the like. A communication link between each one of the input/output means 305 can be wired (for example, connecting the keyboard via a PS/2 or USB port on the chassis of the desktop PC) or wireless (for example, via a wireless link, e.g., radio link, to the base station which is directly connected to the PC, e.g., to a USB port).

The data communication means 306 may be selected based on a particular implementation of a network, to which the computing environment 300 can have access, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 304 may be configured for wired and wireless data transmission, via one of a WAN, a PAN, a LAN, an Intranet, the Internet, a WLAN, a WMAN, or a GSM network, as an example.

These and other components of the computing device 300 may be linked together using a common data bus 310.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to provide certain examples of implementation of the non-limiting embodiments of the present technology rather than to be limiting. The scope of the present technology is therefore intended to be limited solely by the scope of the appended claims.

The invention claimed is:

1. A computer-implementable method for training an ensemble of classifiers to determine malware families of malware, the method comprising:
   receiving a given sample of training malware of a plurality of samples of training malware;
   analyzing the given sample of training malware in an isolated environment;
   generating a respective behavioral report including indications of actions executed by the given sample of training malware in the isolated environment;
   identifying within the respective behavioral reports associated with each one of the plurality of samples of training malware, a report group of behavioral reports associated with the samples of training malware of a given malware family;
   determining by analyzing actions in the report group associated with the given malware family, reference actions common to every sample of training malware in the given malware family;
   generating for a given behavioral report of the report group, a respective training feature vector of a respective plurality of training feature vectors associated with the given malware family, generating a given value of the respective training feature vector comprises:
   determining whether a receptive field of the given behavioral report corresponds to a respective reference action associated with the given malware family;
   training a given classifier of the ensemble of classifiers, based on the respective plurality of training feature vectors to determine if a given in-use sample of malware is of the given malware family; and
   using the ensemble of classifiers to identify the given in-use sample of malware by:
   receiving the given in-use sample of malware;
   analyzing the given in-use sample of malware in the isolated environment;
   generating an in-use behavioral report including indications of actions executed by the given in-use sample of malware;
   generating a given in-use feature vector associated with the given in-use sample of malware,
   a given value of the in-use feature vector being generated based on data in a given field of the in-use behavioral report which corresponds to a respective reference action associated with a respective malware family;
   feeding the given in-use feature vector to a respective classifier the ensemble of classifiers associated with the respective malware family to generate a prediction outcome indicative of whether the given in-use sample of malware is of the respective malware family or not; and
   storing data of the prediction outcome in association with the given in-use sample of malware for further use in the identifying the malware.

2. The method of claim 1, wherein the analyzing the given sample of training malware in the isolated environment comprises analyzing at least one of:
   processes started by the given sample of training malware and each process starting parameters;
   files created by each process;
   mutexes created by each process;
   registry keys created by each process;
   virtual machine screen video during running of the given sample of training malware;
   indications of network activity; and
   harmfulness markers associated with the given sample of training malware.

3. The method of claim 1, wherein the respective behavioral report is a report in a JSON format including at least one of following fields associated with actions executed by the given sample of training malware: IP addresses, registry keys, mutexes, user agents, harmfulness markers, processes and running programs, types of requests and respective domains, and files.

4. The method of claim 1, wherein the prediction outcome of the ensemble of the classifiers takes values from −1 to 1, wherein −1 corresponds to the given in-use sample of malware not being of the given malware family, and 1 corresponds to the given in-use sample of malware being of the given malware family.

5. The method of claim 1, wherein a given ensemble of the classifiers is trained to identify malware of a respective malware family.

6. The method of claim 1, wherein the generating each feature vector comprises applying regular expressions to the respective behavioral report.

7. The method of claim 1, wherein the identifying the report group of behavioral reports associated with the samples of training malware of the given malware family is based on data of a database of known malicious files including behavioral features of one or more known malware families that have been identified using at least one of following approaches: ssdeep hashes, YARA signatures, and IDS signatures.

8. A system for training an ensemble of classifiers to determine malware families for malware, the system comprising at least one processor and at least one non-transitory computer-readable medium storing instructions, which, when executed by the at least one processor, cause the system to:
- receive a given sample of training malware of a plurality of samples of training malware;
- analyze the given sample of training malware in an isolated environment;
- generate a respective behavioral report including indications of actions executed by the given sample of training malware in the isolated environment;
- identify, within the respective behavioral reports associated with each one of the plurality of samples of training malware, a report group of behavioral reports associated with the samples of training malware of a given malware family;
- determine, by analyzing actions in the report group associated with the given malware family, reference actions common to every sample of training malware in the given malware family;
- generate, for a given behavioral report of the report group, a respective training feature vector of a respective plurality of training feature vectors associated with the given malware family, generating a given value of the respective training feature vector comprises:
  - determining whether a receptive field of the given behavioral report corresponds to a respective reference action associated with the given malware family; and
- train a given classifier of the ensemble of classifiers, based on the respective plurality of training feature vectors to determine if a given in-use sample of malware is of the given malware family; and during an in-use phase following the training phase, the at least one processor further causing the system to:
- receive the given in-use sample of malware;
- analyze the given in-use sample of malware in the isolated environment;
- generate an in-use behavioral report including indications of actions executed by the given in-use sample of malware;
- generate an in-use feature vector associated with the given in-use sample of malware,
  - a given value of the in-use feature vector being generated based on data in a given field of the in-use behavioral report which corresponds to a respective reference action associated with a respective malware family;
- feed the in-use feature vector to the ensemble of classifiers to generate a prediction outcome indicative of whether the given in-use sample of malware is of the respective malware family or not; and
- store data of the prediction outcome in association with the given in-use sample of malware for further use in the identifying the malware.

* * * * *